United States Patent
Baker et al.

(10) Patent No.: US 7,272,538 B2
(45) Date of Patent: Sep. 18, 2007

(54) EQUIPMENT MONITORING SYSTEM AND METHOD

(75) Inventors: Lawrence G. Baker, Cincinnati, OH (US); Michael V. Paredes, Indianapolis, IN (US)

(73) Assignee: Earthwave Technologies, Inc., Indianapolis, IN (US)

( * ) Notice: Subject to any disclaimer, the term of this patent is extended or adjusted under 35 U.S.C. 154(b) by 0 days.

(21) Appl. No.: 11/126,112

(22) Filed: May 10, 2005

(65) Prior Publication Data

US 2005/0249333 A1 Nov. 10, 2005

Related U.S. Application Data

(60) Provisional application No. 60/569,781, filed on May 10, 2004.

(51) Int. Cl.
*G06F 11/30* (2006.01)
*G06F 15/00* (2006.01)

(52) U.S. Cl. .................................. 702/186; 702/188

(58) Field of Classification Search ................ 702/182, 702/185–186, 188, 183, 180; 340/539.11, 340/539.13–539.14; 379/29.01, 29.09, 32.01; 700/11, 36; 701/29, 33
See application file for complete search history.

(56) References Cited

U.S. PATENT DOCUMENTS

2003/0115019 A1* 6/2003 Doddek et al. ............. 702/183
2004/0019461 A1* 1/2004 Bouse et al. ................ 702/188

* cited by examiner

*Primary Examiner*—Bryan Bui
(74) *Attorney, Agent, or Firm*—Bruce J. Bowman

(57) ABSTRACT

A system for monitoring a piece of equipment is provided. The system comprises a monitoring device that is associated with the equipment and configured to detect data relating to the operation of the equipment. A communication network is adapted to communicate the data to a server based on a signal received from the monitoring device, and an access device is connected to the communication network and configured to provide the data to an end-user for determining whether the equipment is operating effectively. The monitoring device is adapted to detect when the equipment is moving.

22 Claims, 4 Drawing Sheets

Client: ABC Excavators, Inc.
Project Name: Airport Expansion
Project Description: Earth Removal
Report Date Range: 04/05/2004 - 04/12/2004

Dozer - ABC1
Manufacturer A, Model 1

| Activity | Monday | Tuesday | Wednesday | Thursday | Friday | Saturday | Sunday | Weekly Total |
|---|---|---|---|---|---|---|---|---|
| Start Time 50 | 10:09AM | 6:28AM | 6:39AM | 6:37AM | 7:08AM | 6:35AM | -- | -- |
| Run Hours 52 | 0:46 | 10:41 | 10:20 | 9:49 | 0:52 | 8:23 | -- | 40:51 |
| Activity Time 54 | 0:35 | 7:40 | 7:41 | 7:30 | 0:18 | 6:59 | -- | 30:43 |
| Run-time Utility 56 | 76.09% | 71.76% | 74.35% | 76.40% | 34.62% | 83.30% | -- | 75.19% |

Articulated Dump Truck - ABC3
Manufacturer B, Model 4

| Activity | Monday | Tuesday | Wednesday | Thursday | Friday | Saturday | Sunday | Weekly Total |
|---|---|---|---|---|---|---|---|---|
| Start Time | 7:04AM | 9:41AM | 8:56AM | 9:16AM | 8:11AM | 6:56AM | -- | -- |
| Run Hours | 9:45 | 3:30 | 6:40 | 7:25 | 6:44 | 6:43 | -- | 40:47 |
| Activity Time | 5:10 | 2:14 | 4:50 | 5:51 | 3:42 | 3:58 | -- | 25:45 |
| Run-time Utility | 52.99% | 63.81% | 72.50% | 78.88% | 54.95% | 59.06% | -- | 63.14% |

Scraper - ABC6
Manufacturer C, Model 2

| Activity | Monday | Tuesday | Wednesday | Thursday | Friday | Saturday | Sunday | Weekly Total |
|---|---|---|---|---|---|---|---|---|
| Start Time | 10:12AM | 6:25AM | -- | -- | -- | 6:35AM | -- | -- |
| Run Hours | 0:18 | 28:54 | -- | -- | -- | 8:21 | -- | 37:33 |
| Activity Time | 0:10 | 23:17 | -- | -- | -- | 6:47 | -- | 30:14 |
| Run-time Utility | 55.56% | 80.57% | -- | -- | -- | 81.24% | -- | 80.51% |

FIG. 3

Client: ABC Excavators, Inc.
Project Name: Airport Expansion
Project Description: Earth Removal
Report Start Date: 04/01/2004
Report End Date: 04/13/2004

| Equipment Number | Asset Type | Model | Last Start Date | Run Hours | Activity Timer | Run-Time Utility | Mechanical Meter |
|---|---|---|---|---|---|---|---|
| ABC 1 | Dozer | 1 | Apr 12, 2004 6:52AM EST | 40:51 | 30:43 | 75.19% | 9103:52 |
| ABC 3 | Articulated Dump Truck | 4 | Apr 12, 2004 6:52AM EST | 40:47 | 25:45 | 63.13% | 14335:26 |
| ABC 6 | Scraper | 2 | Apr 12, 2004 6:59AM EST | 44:11 | 35:13 | 79.70% | 18077:17 |

FIG. 4

EQUIPMENT MONITORING SYSTEM AND METHOD

RELATED APPLICATIONS

This application claims the benefit of U.S. Provisional Patent Application Ser. No. 60/569,781 filed May 10, 2004, which is incorporated herein by this reference.

TECHNICAL FIELD

The present invention relates generally to a system and method for monitoring the use of equipment and more particularly to a system and method for monitoring the use of heavy construction equipment.

BACKGROUND OF THE INVENTION

To effectively manage heavy equipment and related machinery, it is essential that accurate information relating to the operation of such equipment be monitored, recorded and analyzed. More particularly, owners of such equipment must be able to track and record critical data relating to the operation of their equipment to effectively implement cost-effective decisions regarding the continued use of such equipment. Unfortunately, current equipment monitoring techniques and systems generally require that this information be gathered manually. However, these manual techniques are often inaccurate and inefficient from a data monitoring standpoint. Thus, it would be desirable to develop an equipment monitoring system which overcomes these and other shortcomings of the prior art.

SUMMARY OF THE INVENTION

The present invention provides a system and method for monitoring equipment that enhances the timely and accurate monitoring of operational data associated with the use of heavy equipment.

In one exemplary embodiment thereof, the present invention provides, a system for monitoring a piece of equipment. The system comprises a monitoring device that is associated with the equipment and configured to detect data relating to the operation of the equipment, a communication network adapted to communicate the data to a server based on a signal received from the monitoring device, and an access device connected to the communication network and configured to provide the data to an end-user for determining whether the equipment is operating effectively. The monitoring device is adapted to detect when the equipment is moving.

In another exemplary embodiment, a method for monitoring a piece of equipment is provided. According to this method, data relating to the operation of the equipment is detected through a monitoring device associated with the equipment, wherein the monitoring device is adapted to detect when the equipment is moving. The data is communicated from the monitoring device to a server by way of a communication network and provided to an access device accessible by an end-user for determining whether the equipment is operating effectively.

BRIEF DESCRIPTION OF THE DRAWING

The above-mentioned aspects of the present invention and the manner of obtaining them will become more apparent and the invention itself will be better understood by reference to the following description of the embodiments of the invention taken in conjunction with the accompanying drawings, wherein:

FIG. 3 depicts an exemplary illustration of a daily report containing equipment monitoring information in accordance with the present invention; and FIG. 4 depicts an exemplary illustration of a summary report containing equipment monitoring information in accordance with the present invention.

Corresponding reference characters indicate corresponding parts throughout the several views.

DETAILED DESCRIPTION

Figure 1:
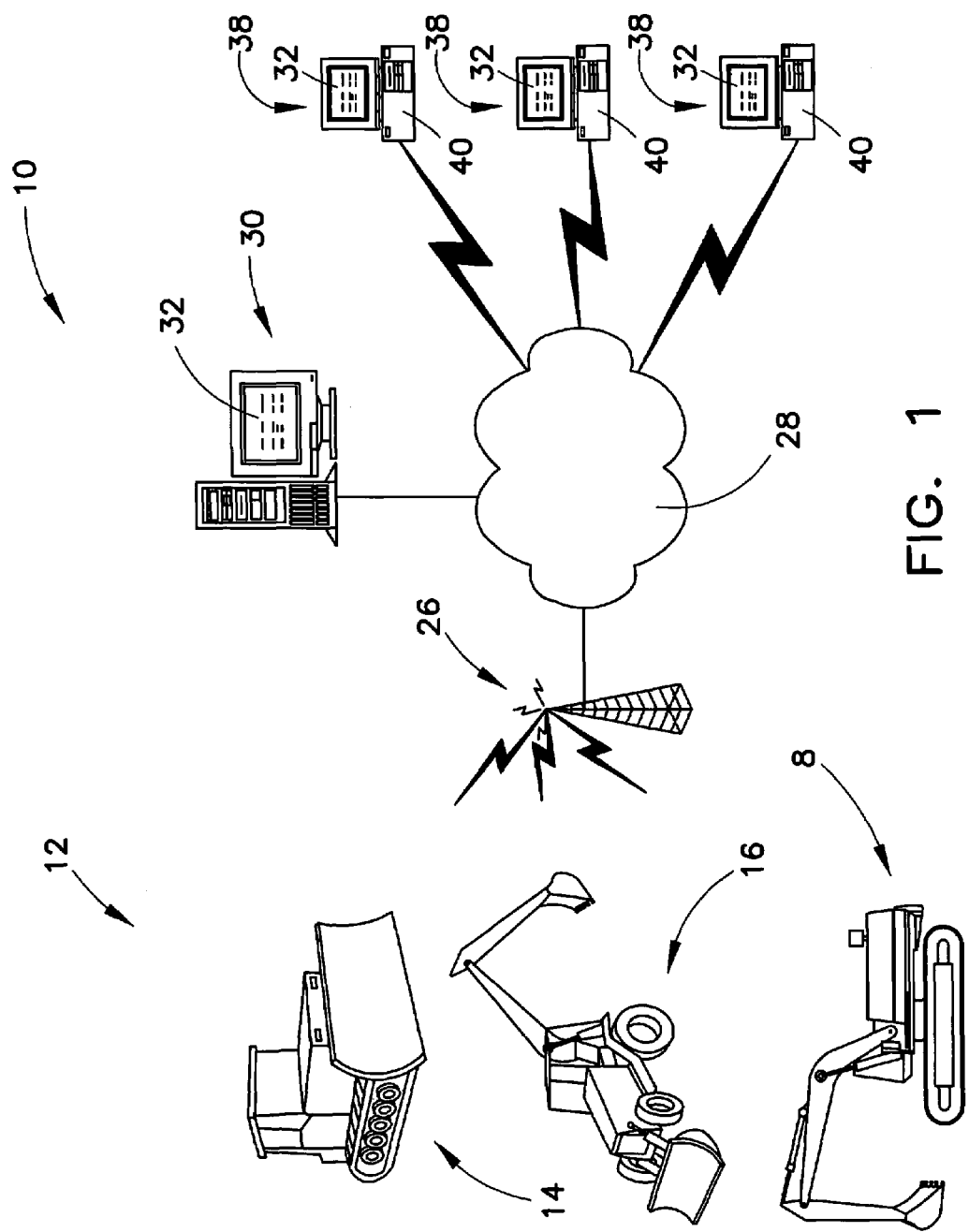
FIG. 1 depicts a diagrammatic view of an equipment monitoring system having several pieces of heavy equipment, a communication network, a server receiving communications from the communication network, and a plurality of network access terminals communicating with the server in accordance with the present invention.

As shown in FIG. 1, a system 10 is provided for monitoring one or more pieces of heavy equipment 12 such as a bulldozer 14, a backhoe 16, and an excavator 18. Although bulldozer 14, backhoe 16, and excavator 18 are shown in FIG. 1, it should be understood and appreciated that other pieces of heavy equipment may also be monitored such as bulldozers, articulated dump trucks, trenchers, rollers, track loaders, trackhoes, scrapers, curb machines, pavement grinders, coal scoops, coal haulers, or any other piece of heavy equipment known to those of ordinary skill in the art without straying from the scope of the present invention. Often, such pieces of heavy equipment are transported between job sites using an over-the-road trailer (not shown), do not include speedometers or odometers, and perform some type of work on their surrounding such as excavating dirt, coal, or other materials, laying pavement or concrete, digging trenches, etc.

Figure 2:
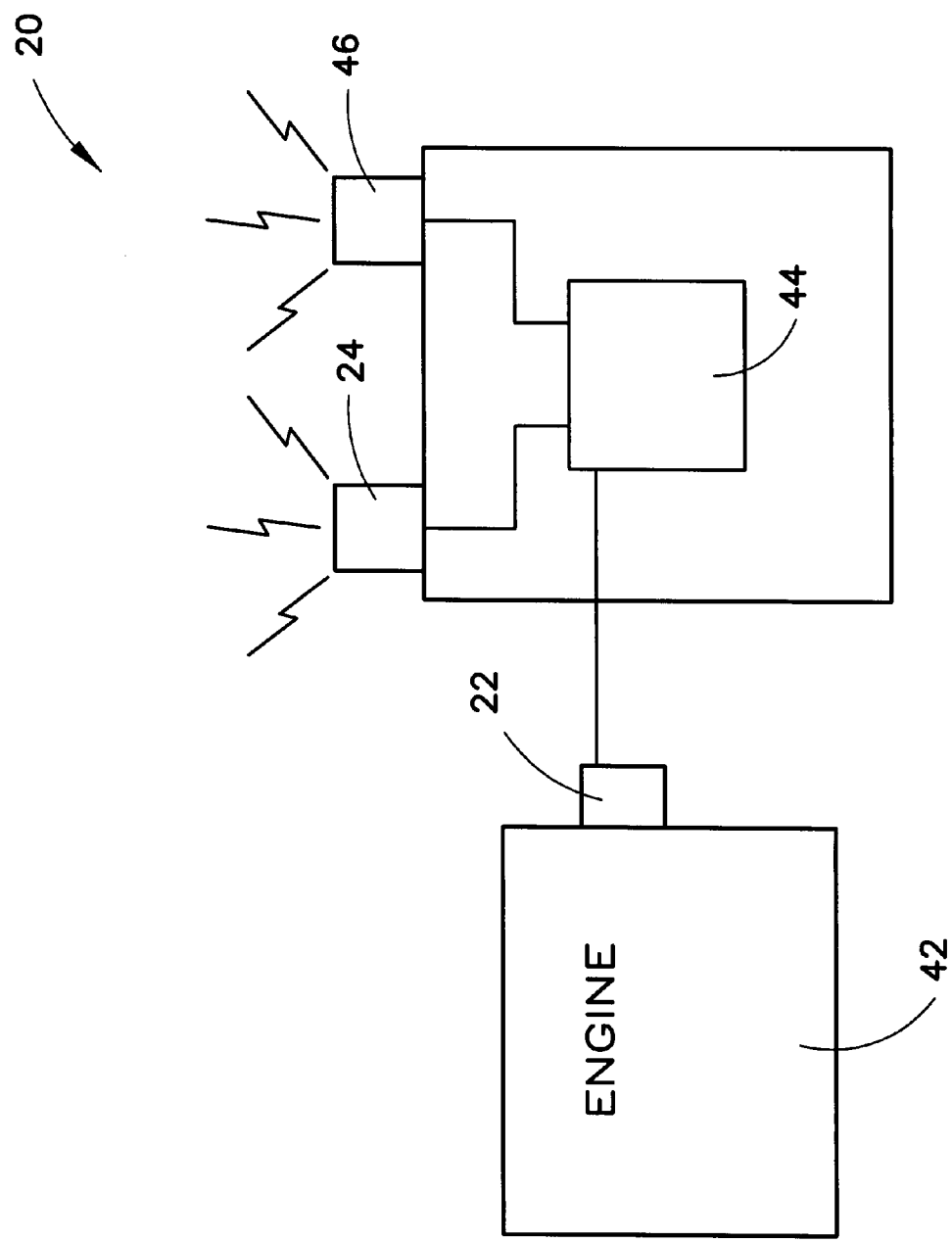
FIG. 2 depicts a diagrammatic view of an exemplary monitoring device for use with one of the pieces of heavy equipment from FIG. 1 showing a sensor coupled to an engine, a controller, a transmitter, and antenna.

As shown in FIG. 2, system 10 includes an electronic monitoring device 20 that is located on each piece of equipment 12 being monitored (e.g., 14, 16, 18). In one exemplary embodiment, each monitoring device 20 includes one or more sensors 22 that sense one or more data parameters of equipment 12 and one or more antennas or transmitters 24 that send data to a wireless communication network 26 shown in FIG. 1. According to this exemplary embodiment, system 10 uses the Internet 28 to communicate data from wireless communication network 26 to a server 30 and uses the data to generate reports 32 such as daily report 34, shown in FIG. 3, and summary report 36, shown in FIG. 4.

According to another exemplary embodiment of the present invention, an end-user, such as a construction company, accesses reports 32 using network access devices 38 such as PC's 40 to monitor the usage of one or more pieces of equipment 12. According to alternative embodiments of the present disclosure, reports 32 may be accessed using PDA's, cell phones having computing capabilities, handheld devices, or any other portable or stationary access devices know to those of ordinary skill in the art.

Sensor 22 is positioned on equipment 12 to determine operational data, such as when engine 42 of a particular piece of equipment 12 is running. Device 20 includes a controller 44 having a microprocessor (not shown), memory (not shown), and software to determine when engine 42 is running based on a signal from sensor 22 and acts as an engine run timer that records how long engine 42 runs for a given period of time.

According to one exemplary embodiment, sensor 22 is a switch located adjacent the ignition switch (not shown) or on/off button (not shown) of equipment 12. When the ignition switch is moved to the "on" position, sensor 22 detects the movement and provides a signal (such as a predetermined voltage) to controller 44 indicating that engine 42 is running. When the ignition switch is moved to the "off" position, sensor 22 detects the movement and provides a signal (such as no voltage) to controller 44 indicating that engine 42 is not running. According to alternative exemplary embodiments of the present disclosure, sensor 22 is positioned at other locations to detect other parameters indicative of engine 42 operating. For example, according to one illustration, sensor 22 is an rpm sensor that detects when the engine is rotating. According to another illustration, sensor 22 is a pressure sensor that detects when the engine oil is pressurized. According to yet another illustration, sensor 22 is a volt or other meter coupled to the alternator/generator of engine 42 to detect when the alternator is being driven by engine 42. According to further exemplary embodiments of the present disclosure, other mechanical, electrical, fluid, etc. parameters of equipment 12 are detected that indicate operation of engine 42.

According to one exemplary embodiment, device 20 is configured to determine the position and velocity of equipment 12. According to this embodiment, device 20 includes a GPS antenna 46 that communicates with satellites (not shown). Based on the communications received from the satellites, controller 44 determines the location and velocity (speed and direction) of equipment 12. Controller 44 uses triangulation to determine the location of equipment 12 based on the given signals from the satellites. According to an exemplary illustration of the present disclosure, controller 44 determines the location of the particular piece of equipment 12, several times per second based on the given signals from the satellites.

By comparing the determined positions over time, controller 44 can determine the velocity of equipment 12. For example, if the position of the equipment changes by four feet to the north over a given period of time and controller 44 makes a position calculation four times per second, controller 44 can determine the rate at which the equipment 12 is moving in the northerly direction (for instance, 10.9 miles per hour (mph), etc.). If the determined position of equipment 12 does not change, controller 44 can calculate the speed of equipment 12 as zero mph. Using this information, controller 44 acts as an engine use timer that records the amount of time each day that equipment 12 is being used based on whether equipment 12 is moving (i.e. controller 44 determines equipment 12 has a speed greater than zero mph) rather than just idling (i.e. controller 44 determines equipment 12 has a speed of zero mph).

According to one exemplary illustration, the first time an operator starts equipment 12 after midnight of each day, device 20 communicates the gathered information to server 30 through communication network 26 and the Internet 28 to server 30. Antenna 24 of device 20 transmits the engine run time and the engine use time stored by controller 44 to communication network 26 which communicates the data to server 20 through the Internet 28. According to alternative embodiments of the present disclosure, the data is transmitted at other intervals such as predetermined times throughout the day or continuously.

In specific embodiments, antenna 24 and communication network 26 use cell phone technologies and protocols known to those of ordinary skill in the art. According to alternative embodiments of the present disclosure, other communications technologies, networks, and protocols are used such as satellite communications, land-line communications, radio communications, and other communications technologies, networks, and protocols known to those of ordinary skill in the art.

Server 30 receives the data from network 26 and stores the data in memory for the generation of reports 32. Reports 32 are then accessed by a contractor, job scheduler, etc. through the Internet 28 using network access devices 38, such as PC's 40 shown in FIG. 1.

As shown in FIG. 3, each daily report 34 includes various fields indicating the customer or client name, project name, report description, and the date range. Daily report 34 is customized to include sub-reports 48 for specific pieces of equipment 12 located on a particular project. Each sub-report 48 includes a start time field 50 for each day, a run time field 52 indicating the engine run time for each day, an activity time field 54 indicating how long the equipment was moving or in use each day, and a run-time utilization field 56. Run-time utilization field 56 is based on run time field 52 and activity time field 54. Specifically, the run-time utilization equals the activity time divided by engine run time presented as a percentage.

According to an exemplary illustration of the present invention, if the equipment utilization is high, this indicates that the particular piece of equipment 12 is being used efficiently while running. If the utilization is low, this indicates that equipment 12 is idling too much and wasting fuel. For example, if four articulated dump trucks are assigned to a job to move dirt from a loading site to a dump site and the average utilization for the dump trucks is below 70%, this is an indication that there is probably at least one too many dump trucks assigned to the job. Based on this information, the job site manager can remove one or more dump trucks from the job to reduce labor and equipment expenses without reducing the total amount of dirt hauled. Additionally, if the dump trucks have an unusually high utilization, this may indicate that the dump trucks have no down time and the loader is idling while waiting for the next empty dump truck to arrive from the dump site. Based on this information, the job site manager can assign additional dump trucks to the job to increase the utilization of the loader and increase the total amount of dirt hauled in a day.

As shown in FIG. 4, summary report 36 includes various fields indicating the customer or client name, project name, report description, and the selected date range. Each report 48 includes a last start time field 58, a total run hours field 60 indicating the engine run time for the selected date range, an activity timer field 62 indicating how long the equipment was moving or in use during the date range, a run-time utilization field 64, and a mechanical meter field 66 indicating the total engine run time for the specific piece of equipment 12. Similar to daily report 34, a scheduler or job site manager can review the utilization for the various pieces of equipment 12 to determine if there are too many or too few pieces of equipment 12 on a particular job site.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A system for monitoring a piece of heavy equipment, comprising:
   a monitoring device associated with the heavy equipment and configured to detect data relating to the operation of the heavy equipment;
   a communication network adapted to communicate the data to a server based on a signal received from the monitoring device; and
   an access device connected to the communication network and configured to provide the data to an end-user for determining whether the heavy equipment is operating effectively, and
   wherein the monitoring device is adapted to detect when the heavy equipment is moving about the earth via an engine of the heavy equipment.

2. The system of claim 1, wherein the monitoring device comprises a sensor adapted to detect one or more data parameters relating to the operation of the heavy equipment.

3. The system of claim 2, wherein the sensor is adapted to detect when the engine of the heavy equipment is running.

4. The system of claim 3, wherein the access device is configured to provide a comparison between when the engine is running and when the heavy equipment is being used.

5. The system of claim 1, wherein the monitoring device comprises a transmitter configured to transmit the data to the communication network.

6. The system of claim 1, wherein the communication network communicates the data to the server through an Internet connection.

7. The system of claim 1, wherein the access device comprises a computer.

8. The system of claim 1, wherein the monitoring device further comprises a controller configured to receive the signal.

9. The system of claim 8, wherein the controller further comprises an antenna in communication with a satellite and configured to determine position and velocity of the heavy equipment through a triangulation process.

10. A method for monitoring a piece of heavy equipment, comprising:
    (a) detecting data relating to the operation of the heavy equipment through a monitoring device associated with the heavy equipment, the monitoring device being adapted to detect when the heavy equipment is moving about the earth via an engine of the heavy equipment;
    (b) communicating the data from the monitoring device to a server by way of a communication network;
    (c) providing the data to an access device accessible by an end-user for determining whether the heavy equipment is operating effectively; and
    (d) the access device generating a report from the data regarding movement of the heavy equipment about the earth.

11. The method of claim 10, wherein step (a) comprises detecting one or more data parameters relating to the operation of the heavy equipment with a sensor associated with the monitoring device.

12. The method of claim 11, wherein the sensor is adapted to detect when the heavy equipment is moving.

13. The method of claim 12, wherein moving comprises a speed of greater than zero mph for the heavy equipment.

14. The method of claim 11, wherein the sensor is adapted to detect when the heavy equipment is idling.

15. The method of claim 14, wherein idling comprises a speed of zero mph for the heavy equipment.

16. The method of claim 11, wherein the sensor is adapted to detect when the engine associated with the heavy equipment is running.

17. The method of claim 10, wherein the step (b) comprises transmitting the data to the communication network by way of a controller associated with the monitoring device.

18. The method of claim 17, wherein the controller further comprises an antenna in communication with a satellite and configured to determine the position and velocity of the heavy equipment through a triangulation process.

19. The method of claim 10, wherein the access device is further configured to provide a comparison between when the engine is running and when the heavy equipment is being used.

20. The method of claim 10, wherein the communication network communicates the data to the server through an Internet connection.

21. The method of claim 10, wherein the access device comprises a computer.

22. The method of claim 10, further comprising the step of generating a report relating to the operation of the heavy equipment.

* * * * *